(12) United States Patent
Yan et al.

(10) Patent No.: US 7,099,161 B2
(45) Date of Patent: Aug. 29, 2006

(54) CONVERTER WITH SYNCHRONOUS RECTIFIER WITH ZVS

(75) Inventors: Chao Yan, Taoyuan Shien (TW); Hao-Yi Ye, Taoyuan Shien (TW); Hong-Yang Wu, Taoyuan Shien (TW); Jian-Hong Zeng, Taoyuan Shien (TW); Jian-Ping Ying, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 109 days.

(21) Appl. No.: 10/858,243

(22) Filed: Jun. 1, 2004

(65) Prior Publication Data

US 2005/0265056 A1    Dec. 1, 2005

(51) Int. Cl.
*H02H 3/335* (2006.01)
(52) U.S. Cl. .......................................... 363/17; 363/89
(58) Field of Classification Search ................. 363/89, 363/17, 127, 56.05, 53
See application file for complete search history.

(56) References Cited

U.S. PATENT DOCUMENTS 6,091,616 A * 7/2000 Jacobs et al. ............... 363/127
6,111,769 A * 8/2000 Zhang et al. ................ 363/127
6,839,246 B1 * 1/2005 Zhang et al. ............. 363/21.06
6,888,728 B1 * 5/2005 Takagi et al. ................. 363/17

* cited by examiner

*Primary Examiner*—Shawn Riley
(74) *Attorney, Agent, or Firm*—Volpe and Koenig, P.C.

(57) ABSTRACT

A control method for a first synchronous rectifier and a second synchronous rectifier in a switching power converter is presented. The switching power converter includes a transformer, and a first switching device and a second switching device connected in series and in parallel with an input voltage source. The first synchronous rectifier is connected with a low end of a secondary winding of the transformer. The second synchronous rectifier is connected with a high end of the secondary winding of said transformer. The first switching device is connected with a high end of the input voltage source, and the second switching device is connected with a low end of the input voltage source. The control includes the steps of driving the first switching device to an on state and the second switching device to an off state; and driving the second synchronous rectifier to an off state after the second switching device has been driven to an on state, such that a power is delivered from the primary winding to the secondary winding.

20 Claims, 14 Drawing Sheets

CONVERTER WITH SYNCHRONOUS RECTIFIER WITH ZVS

FIELD OF THE INVENTION

The present invention relates to switching power supplies and particularly to a method and circuit for controlling synchronous rectifiers used in ZVS DC/DC converter.

BACKGROUND OF THE INVENTION

As the same with most power supply products, the development trends of DC/DC converter is towards high efficiency, high power density, high reliability and, low cost. For a conventional ZVS DC/DC converter with the diode rectification, the conduction loss of the diode rectifier is normally about 30%–40% of the total loss of the converter. Obviously, in order to further improve the efficiency of the DC/DC converter, it is a good idea to reduce the conduction loss of the rectifier. Synchronous rectifier, which has the lower conduction loss, may be used in DC/DC converter. Although the employment of the synchronous rectifier can significantly reduce the conduction loss, the driver issue of the synchronous rectifier has to be considered.

From the point of view of the synchronous rectifier, the ideal operation mode of the driver is: turning on the synchronous rectifier as soon as the body diode conducts, and turning off the synchronous rectifier as soon as the current flows through the synchronous MOSFET crosses to zero. The advantage of the aforementioned mode is that the conduction time of the body diode is nearly zero to avoid the additional conduction loss and the reverse recovery relevant loss.

Obviously, the control of the synchronous rectifier contains two key points: turning on and turning off. If the synchronous rectifier is turned on before the voltage $V_{DS}$ decreased to zero and body diode conducted, it will result in the parasitic capacitor discharging loss: $P=0.5C_{oss}V_{DS2}f_s$. If the synchronous rectifier is turned on after the diode conducted by time $\tau$, it will result in the additional conduction loss: $P=I_d(V_D-V_{MOS})\tau f_s$. If the synchronous rectifier is turned off before the current of MOSFET $I_d$ decreased to zero, it means the body diode conducts current just before it was turned off. It will cause not only the additional conduction loss, but also severe reverse recovery losses. Normally, the higher voltage rating of the MOSFET is, the poorer reverse recovery characteristics of the body diode is. If the synchronous rectifier is turned off after the MOSFET current $I_d$ crossed zero, the direction of the MOSFET current $I_d$ will be changed. As a result, after turning off the MOSFET, the severe voltage overshoot occurs across the drain to source terminal of the MOSFET so that the MOSFET suffers the risk of voltage breakdown.

Typically, there are two types of the synchronous rectifier driving modes: current driving mode and voltage driving mode. The principle of the current driving mode is very simple. To sense the current flowing through the synchronous rectifier and turn on the synchronous rectifier when the current crosses zero to a positive value, the synchronous rectifier must be turned off when the current crosses zero to negative value. This is the optimum synchronous rectifier driving mode theoretically. This driving mode is able to avoid the conduction of the body diode of the synchronous rectifier and hence to avoid the additional conduction loss and reverse recovery loss. Two optional current sensing methods including the direct sensing method and indirect sensing method can be employed to sense the current of the synchronous rectifier. The indirect sensing method subtracts the magnetizing current from the transformer primary current to get the reflected secondary current of the synchronous rectifier. The disadvantage of the indirect sensing method is the precision level of the sensed current is not so high. The direct sensing method uses the Hall sensor, current transformer or sensing resistor to directly sense the current of the synchronous rectifier. However, the mentioned method may suffer from the high cost, big size or high loss.

Actually, the voltage driving mode is more popular in most applications. One of the voltage driving modes employs the control signals from the windings (which may be power windings or auxiliary windings) or the circuit node such as the intermediate node of the bridge leg. Another one of the voltage driving modes employs the control signals from the primary MOSFET control signals.

Figure 1:
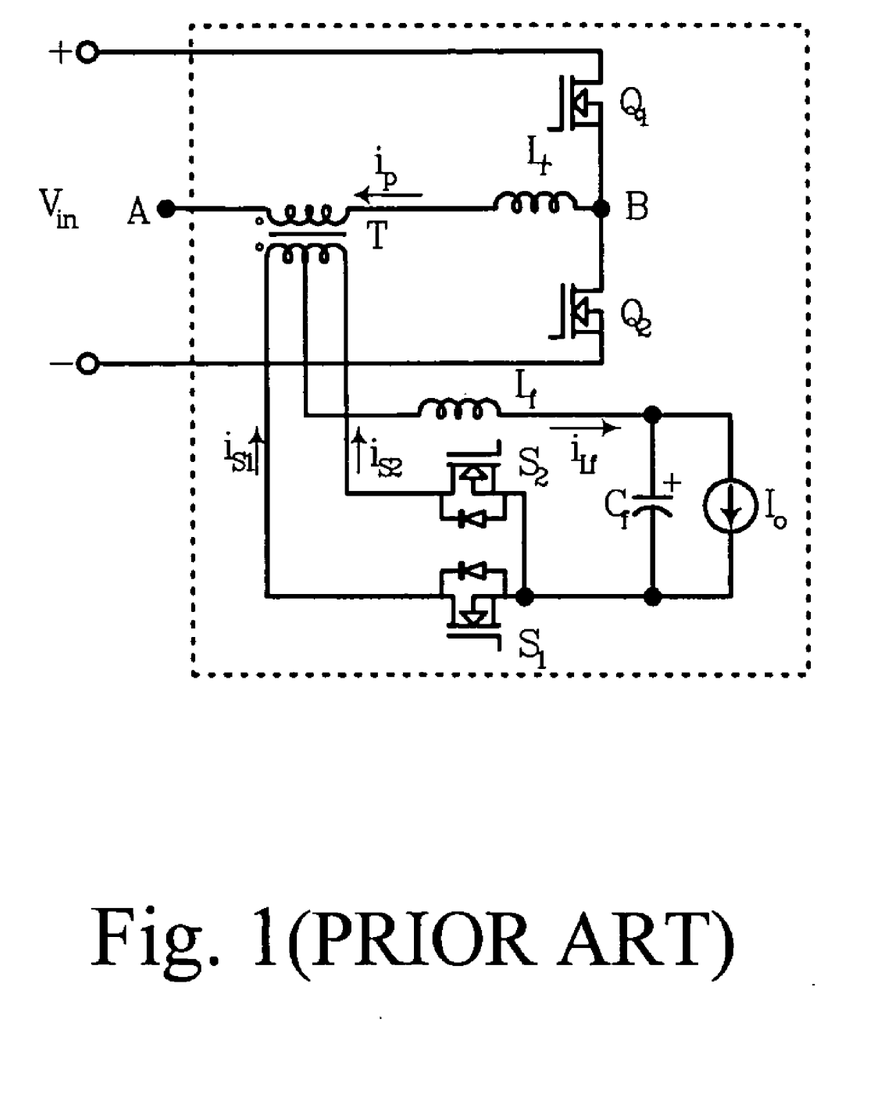
FIG. 1 is a diagram of a part of the bridge type ZVS DC/DC converter with synchronous rectifiers.

FIG. 1 shows a part of the typical ZVS DC/DC converter circuit. Different connections to the node A gives the different circuit topologies. If two capacitors are connected from the node A to the positive bus and negative bus, this connection gives the asymmetric controlled half bridge topology shown in FIG. 2. If two MOSFETs are connected from the node A to the positive bus and negative bus, this connection gives the phase shifted ZVS full bridge topology shown in FIG. 3.

Figure 4:
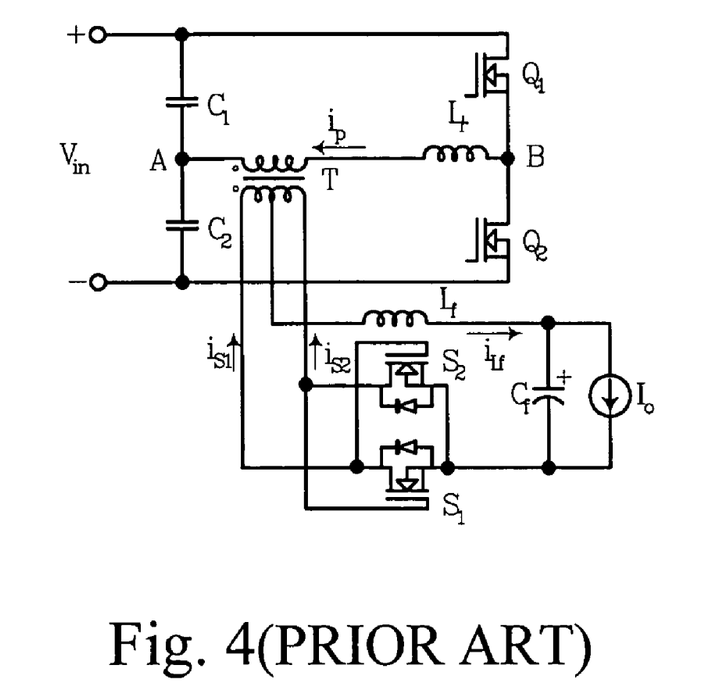
FIG. 4 is a diagram of asymmetric ZVS half bridge converter with self-driven synchronous rectifier according to the prior art.
Figure 5:
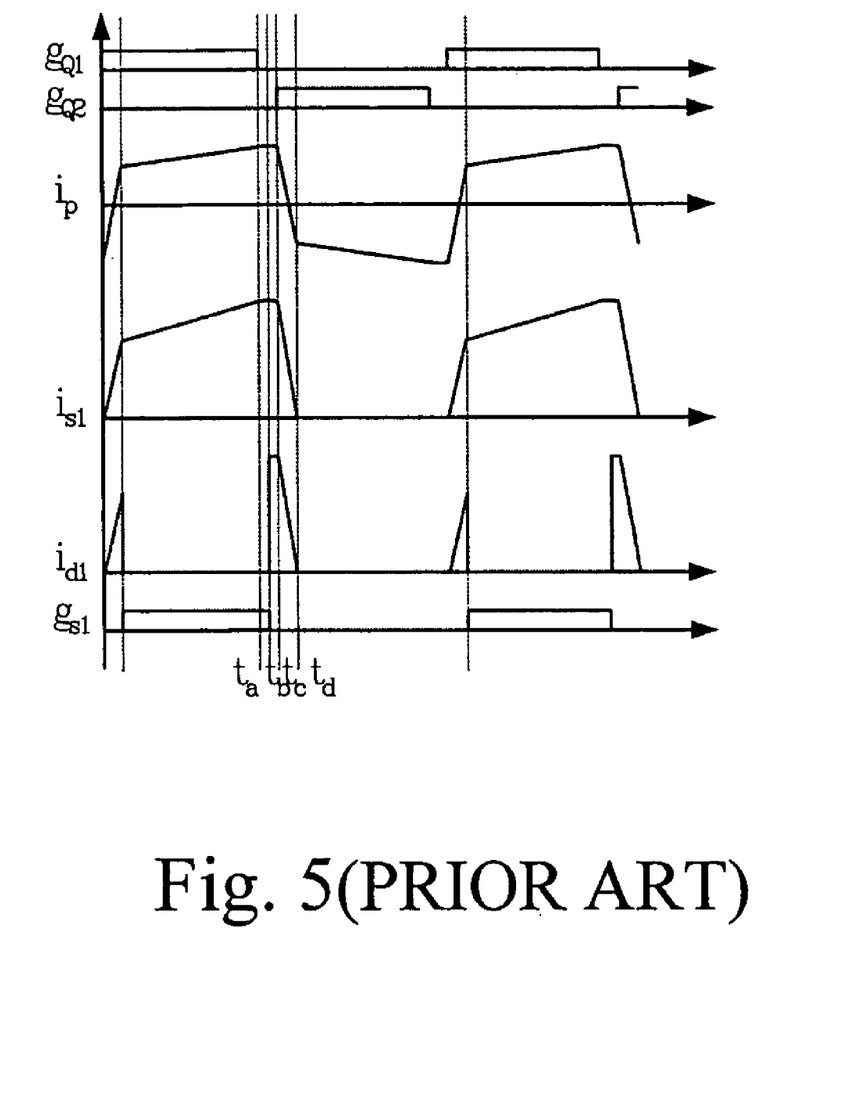
FIG. 5 is a key wave diagram of the asymmetric ZVS half bridge converter as shown in FIG. 4 according to the prior art.

FIG. 4 shows an asymmetric half bridge topology with the synchronous rectifier applied by the prior art. FIG. 5 shows the key waveform timing diagram applying this prior art. From FIG. 5, the synchronous rectifier S1 is turned on after the current transition of the S1 and S2 and is turned off at $t_b$. Therefore, the conduction time of the body diode has three phases: the current transition phase before the conduction of the synchronous rectifier S1, the primary resonant phase $t_b \sim t_c$ after turning off the synchronous rectifier S1, and the current transition phase $t_c \sim t_d$ after turning off the synchronous rectifier S1.

Figure 6:
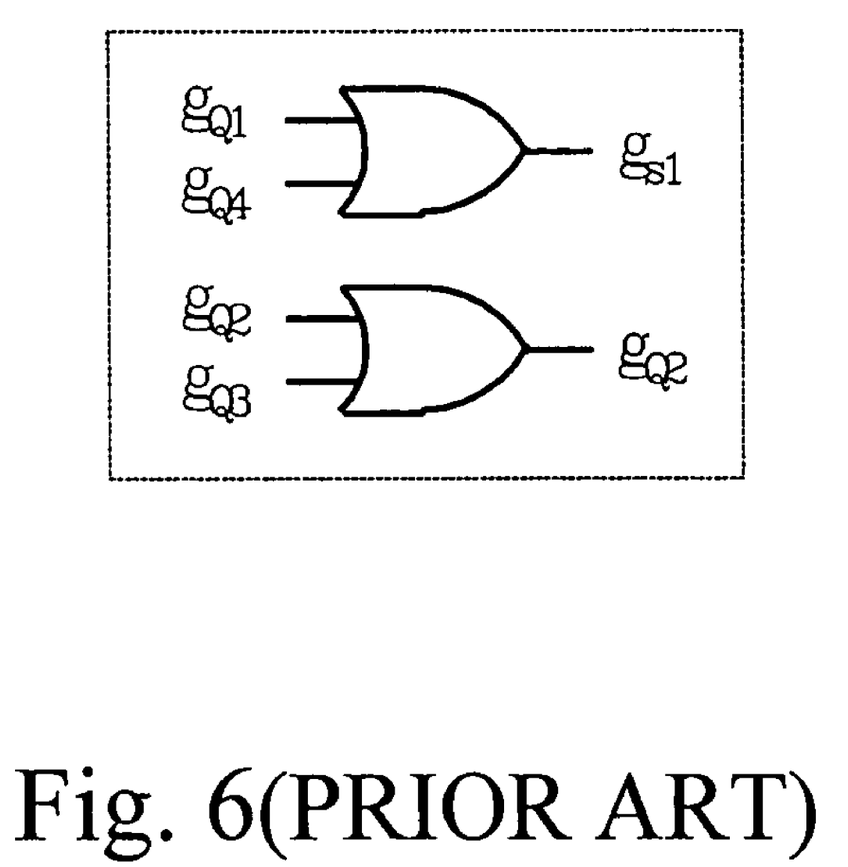
FIG. 6 is a logic diagram of the synchronous rectifier control method for ZVS full bridge converter shown in FIG. 3 according to the prior art.
Figure 7:
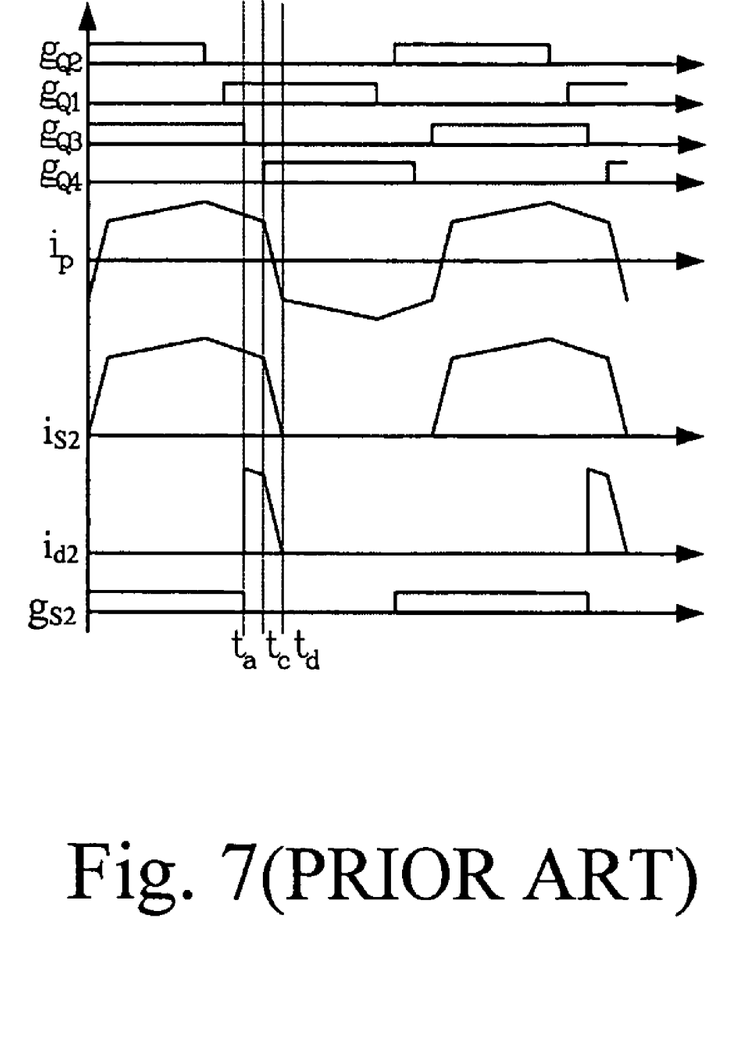
FIG. 7 is a key wave diagram of the control method shown in FIG. 6 according to the prior art.

FIG. 6 shows a logic circuit used in phase shift full bridge topology with synchronous rectifiers which was proposed by Vijay Gangadhar Phadke in U.S. Pat. No. 6,504,739. The signals $g_{Q1} \sim g_{Q4}$ are the control signals for the primary MOSFET and the signals $g_{S1} \sim g_{S2}$ are for the secondary MOSFET. FIG. 7 shows the key waveform timing diagram applying this prior art shown in FIG. 6. From FIG. 7, the conduction time of the body diode has two phases: the primary resonant phase $t_a \sim t_c$ after turning off the synchronous rectifier S1, and the current transition phase $t_c \sim t_d$ after turning off the synchronous rectifier S1.

SUMMARY OF THE INVENTION

It is the main object of the present invention to provide an improved voltage driving scheme to control the synchronous rectifier. The main feature of the proposed method is that the conduction time of the synchronous rectifier is prolonged and the conduction time of the body diode is minimized at the case of no MOSFET current information.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 10:
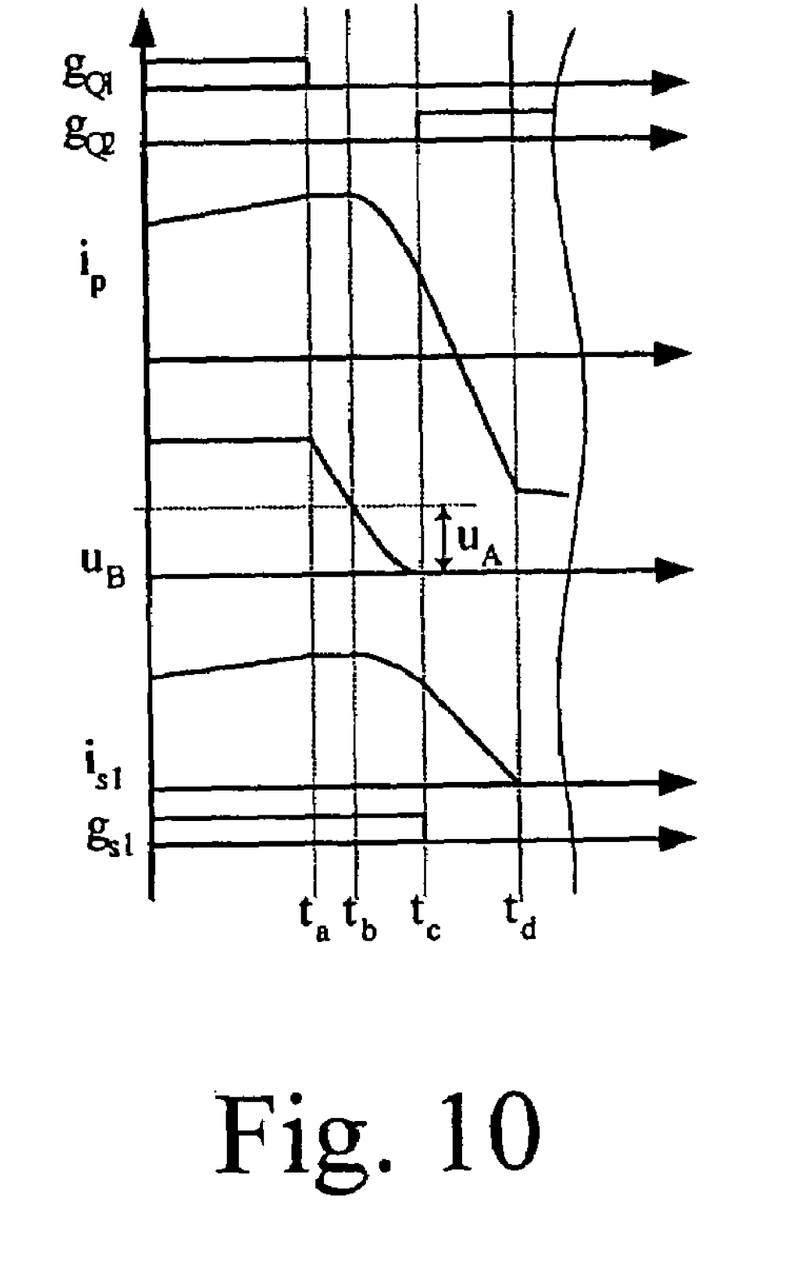
FIG. 10 is a detailed wave diagram of the control method for detail description according to the present invention.

To facilitate the explanation of the detailed technique features of the prior art and the proposed driving method, it is necessary to analyze the key current and voltage variation after the turning off of the primary MOSFET. FIG. 10 shows the detailed timing diagram of the proposed control method, which is for the asymmetric controlled half bridge topology shown in FIG. 2.

Figure 2:
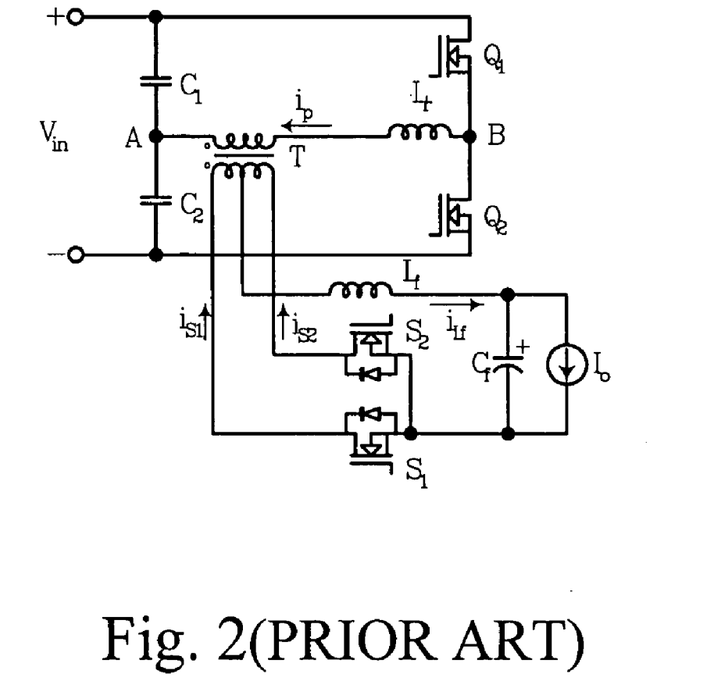
FIG. 2 is a diagram of the asymmetric controlled ZVS half bridge converter with the synchronous rectifier.

Please refer to FIG. 2, the switching power converter includes an input voltage source $V_{in}$, a first switching device $Q_1$ and a second switching device $Q_2$, a transformer T, a rectifying circuit including a first synchronous rectifier $S_2$ and a second synchronous rectifier $S_1$. The first switching device $Q_1$ is connected with the high end of the input voltage source $V_{in}$. The second switching device $Q_2$ is connected with the low end of the input voltage source $V_{in}$. The two switching devices $Q_1$ and $Q_2$ are connected in series and in parallel with the input voltage source $V_{in}$. For the substantially zero voltage switching asymmetric controlled half bridge converter, there are further two capacitors connected in series between the high end and the low end of the input voltage source $V_{in}$ and connected with the high end of the primary winding The transformer T has a primary winding and a secondary winding. The high end of the primary winding is connected with the input voltage source $V_{in}$, and the low end of the primary winding is connected with the two switching devices $Q_1$ and $Q_2$ through a resonant inductor $L_r$ (which includes the leakage inductance of the transformer T and the external series inductance).

The first synchronous rectifier $S_1$ is connected with the low end of the secondary winding. The second synchronous rectifier $S_2$ is connected with the high end of the secondary winding.

The operation mode of the circuit will be analyzed as follows:

Mode 1 $t_a \sim t_b$: For the asymmetric controlled half bridge topology, the steady state voltage of the node A is: $U_A = D_{Q1} \cdot V_{in}$, where $D_Q$ is the duty cycle of $Q_1$. Primary MOSFET is turned off at $t_a$. In this time, the primary current charges the junction capacitor of $Q_1$ and discharges the junction capacitor of $Q_2$. Before the voltage of node B falls to $U_A$, the voltage crossing the transformer is $U_B - U_A$. In this mode, the secondary MOSFET $S_1$ conducts, $S_2$ keeps in off state. The primary current $i_p$ almost keeps the same.

Mode 2 $t_b \sim t_c$: When the voltage of node B falls to $U_A$, the secondary MOSFET $S_1$ and $S_2$ both conduct and the transformer T is short. In this time, the voltage crossing the resonant inductor $L_r$ is $U_B - U_A$. In this mode, a series resonance occurs between the resonant inductor $L_r$, the junction capacitor of $S_1$ and $S_2$, and the blocking capacitor $C_1$. The current of $L_r$ will decrease and the voltage of node B will also fall. When the voltage of node B deceased to zero, ZVS can be achieved to turn on the MOSFET $Q_2$.

Mode 3 $t_c - t_d$: The primary current $i_p$ will decrease linearly by the decreasing rate $di_p/dt = U_A/L_r$ when $Q_2$ is turned on at $t_c$. In this mode, the current transition occurs between $S_1$ and $S_2$ by the transition rate $di_{s1}/dt = -0.5 \cdot N \cdot U_A/L_r$, where N is the primary to secondary turn ratio. From the FIG. 2, $i_{s1} + i_{s2} = i_{Lf}$, when the current of $S_2$ equals to the current of filter inductor $i_{Lf}$ at $t_d$, $S_1$ was turned off and the voltage crossing the transformer changed to be $U_A$. This mode is the so-called duty cycle loss period. After this mode, power was delivered from the primary side to the secondary side.

Figure 3:
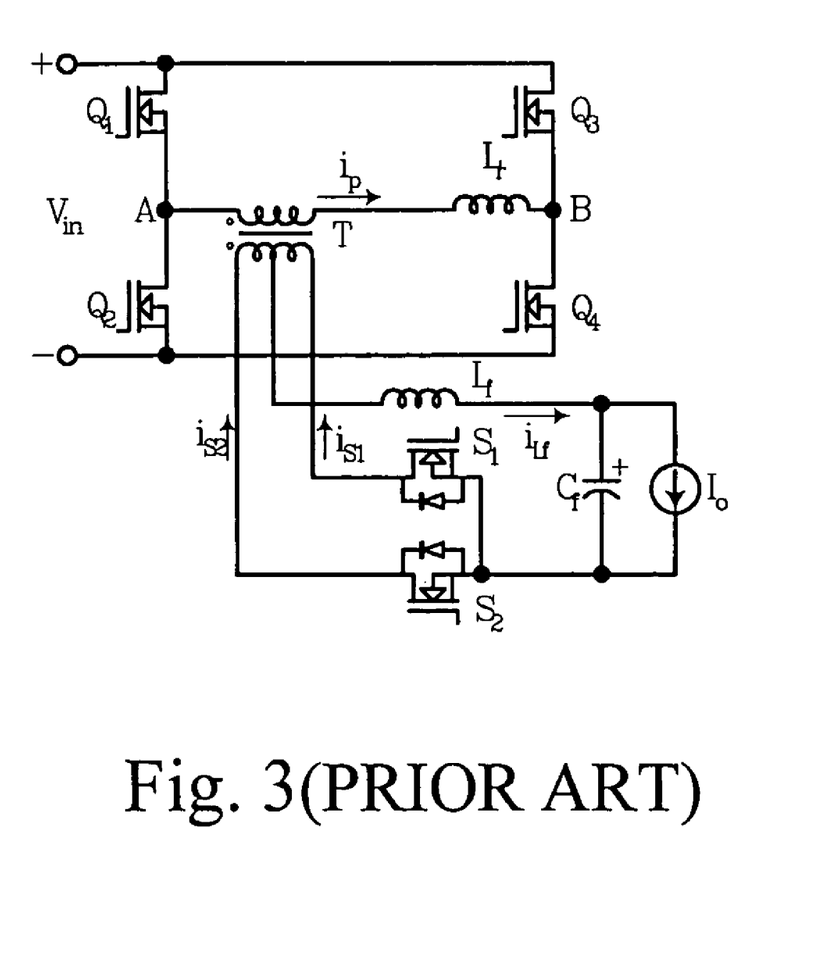
FIG. 3 is a diagram of the phase shifted ZVS full bridge converter with the synchronous rectifier.

FIG. 3 shows a phase shift controlled ZVS full bridge topology. The difference between FIG. 2 and FIG. 3 is: the switching power converter of FIG. 3 includes two switching devices $Q_3$ and $Q_4$ connected in series between the high end and the low end of the input voltage source $V_{in}$ and connected with the high end of the primary winding Compared with the half bridge topology, because the primary MOSFET $S_1$ keeps conduction and voltage of the node A keeps Vin after the turning off of the MOSFET $Q_3$, the aforementioned current transition procedure Mode1 can be ignored for the full bridge topology. And the mode 2 and mode 3 of the full bridge topology are all the same with that of half bridge topology.

Obviously, the duration time of mode 3 $t_d - t_c$ is the load current dependent. The more load current is, the longer duration time of mode 3 is. When the circuit operated at no load case, the duration time of mode 3 is nearly zero.

The main technique of the present invention is that the secondary MOSFET S1 is not turned off until the primary MOSFET Q2 is turned on at $t_c$. If the information of the load current is not available, the proposed voltage driving scheme is almost optimized to cover the whole load range.

Figure 8:
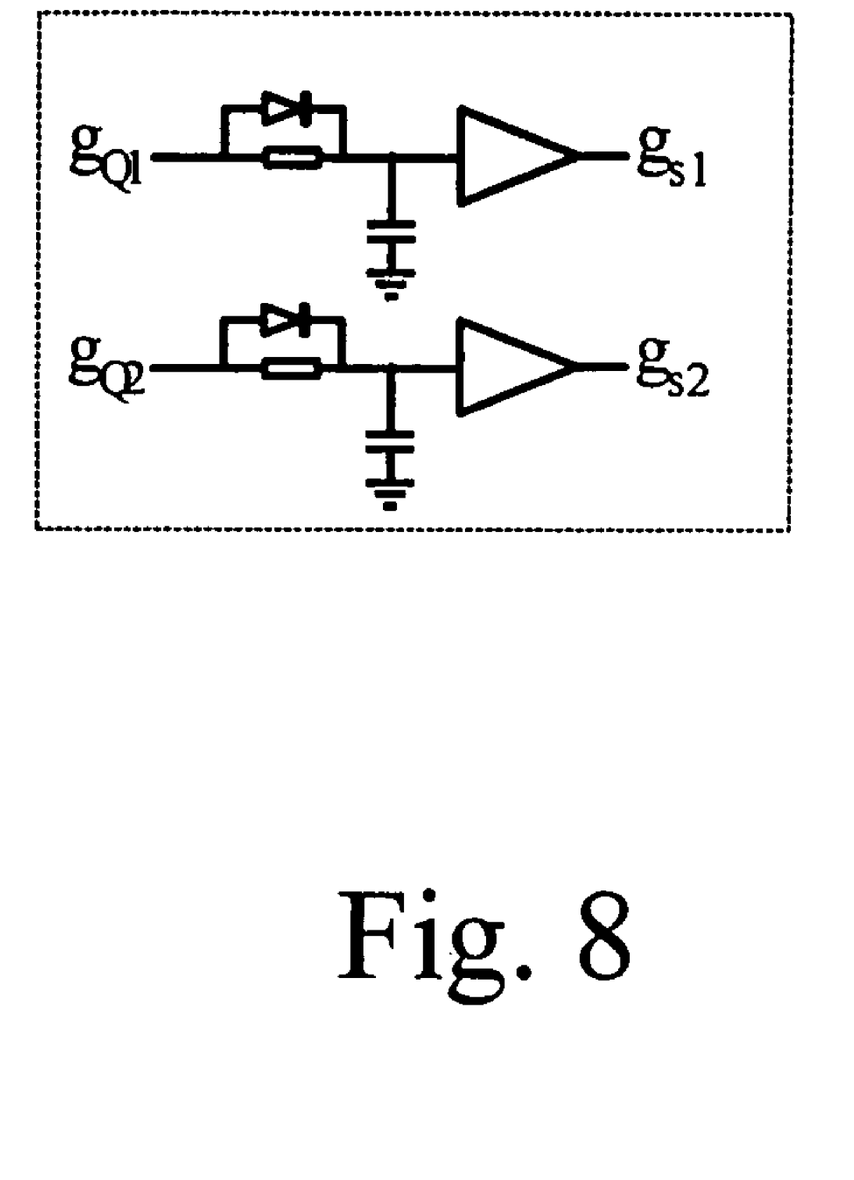
FIG. 8 is a logic diagram of the control method for the asymmetric ZVS half bridge converter according to the present invention.
Figure 9:
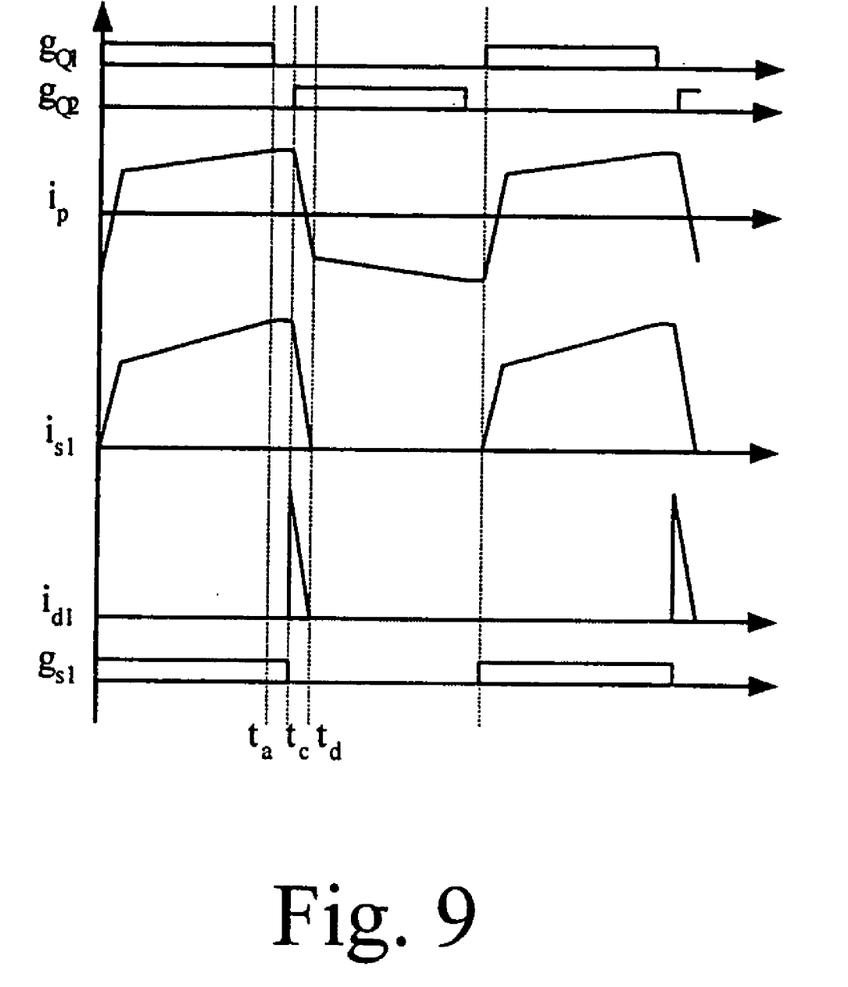
FIG. 9 is a key wave diagram of the control method for the asymmetric ZVS half bridge converter shown in FIG. 8 according to the present invention.

FIG. 8 is a logic diagram of the control circuit for the asymmetric ZVS half bridge converter according to the present invention. It uses a pair of combinations of a diode, a resistor, a capacitor, and a buffer to drive the two synchronous rectifiers $S_1$ and $S_2$. The delay time of the time-delay circuit is designed to be $t_c$–$t_b$. FIG. 9 is a key wave timing diagram. From FIG. 9, the conduction time of the body diode has only one phase: the current transition phase $t_c$~$t_d$ after turning off the synchronous rectifier $S_1$. Compared with the prior art shown in FIG. 4, the conduction time of the body diode is shortened, therefore, the additional conduction loss is also reduced and the converter efficiency can be improved.

Figure 11:
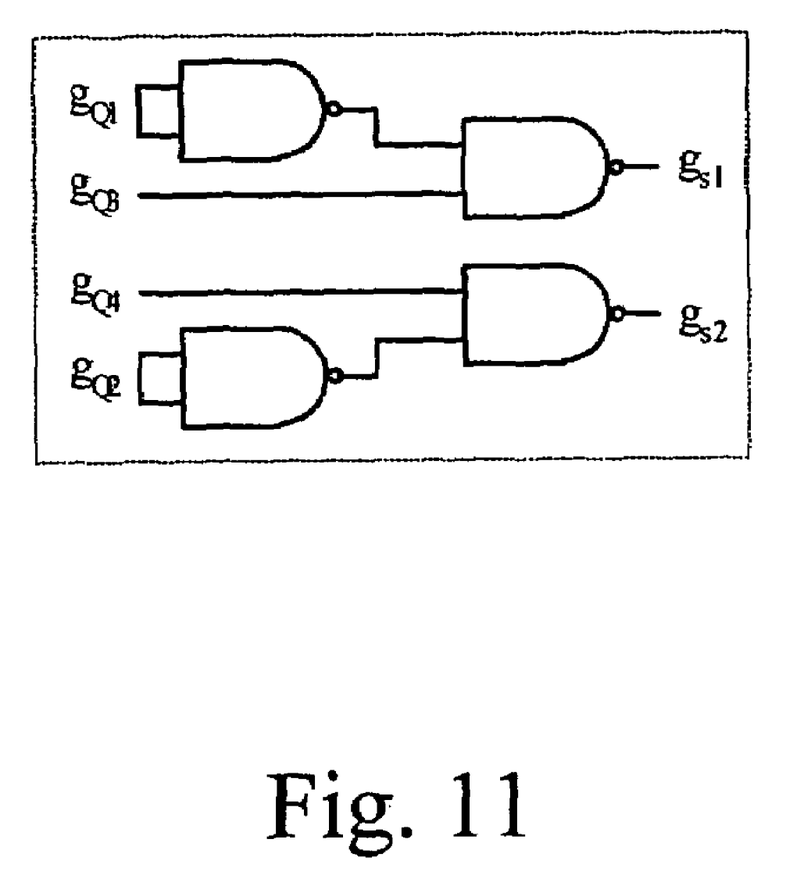
FIG. 11 is another logic diagram of the control method for the phase shifted ZVS full bridge converter according to the present invention.
Figure 12:
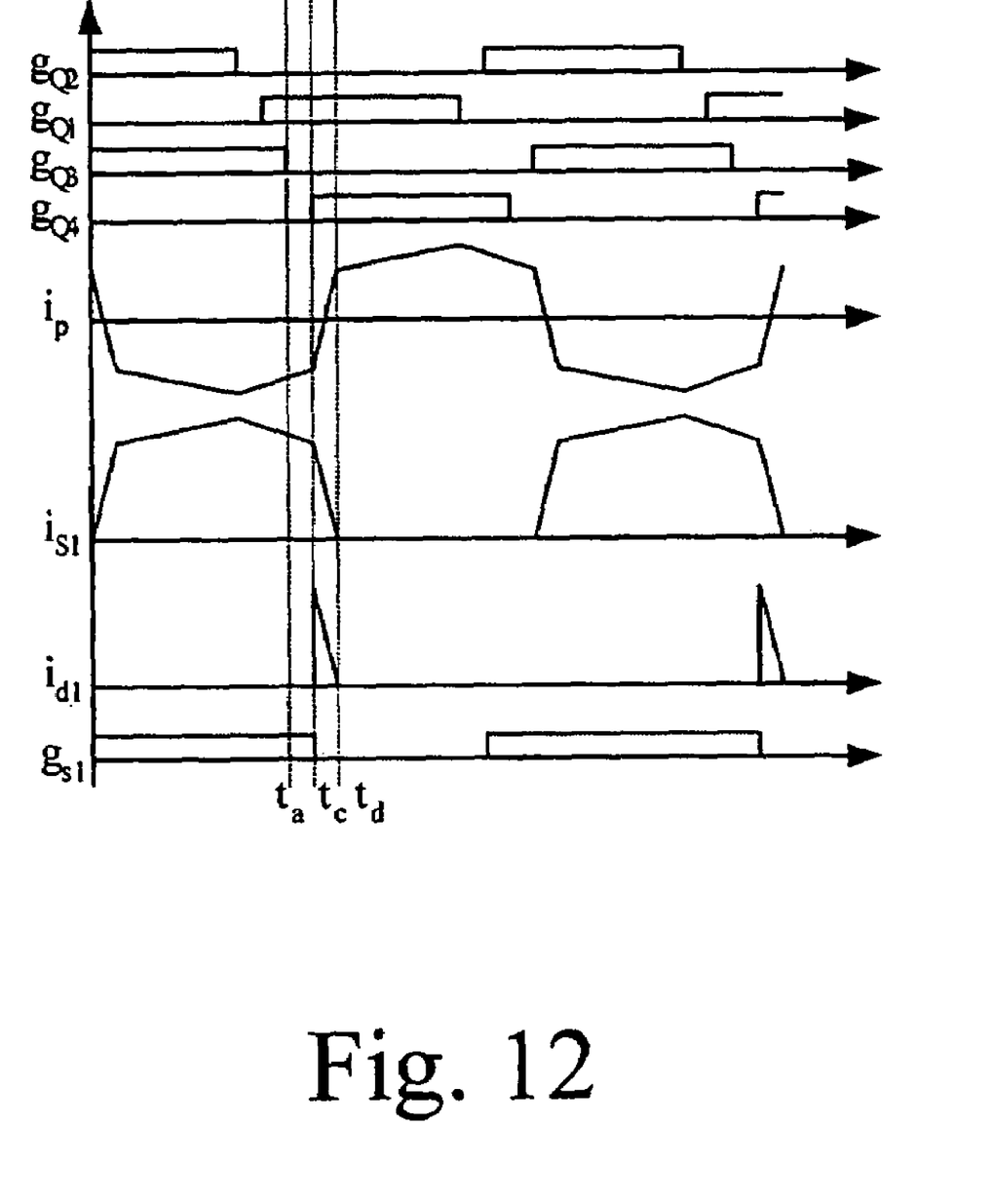
FIG. 12 is a key wave diagram of the control method for the phase shifted ZVS full bridge converter according to the present invention.

FIG. 11 is another logic diagram of the control method for the phase shifted ZVS full bridge converter according to the present invention. The $g_{Q1}$ to $g_{Q4}$ are the control signals for the primary MOSFET and the $g_{S1}$~$g_{S2}$ are the control signals for the secondary MOSFET. FIG. 12 is a key wave timing diagram. From FIG. 12, the conduction time of the body diode has only one phase: the current transition phase $t_c$~$t_d$ after turning off the synchronous rectifier $S_1$. Compared with the prior art shown in FIG. 4, the conduction time of the body diode is shortened, therefore, the additional conduction loss is also reduced.

The synchronous rectifier driving scheme shown in FIG. 8 and FIG. 11 is the typical embodiment of the invention. Nevertheless, it will be understood that various modifications may be made without departing from the spirit and scope of the invention.

Figure 13:
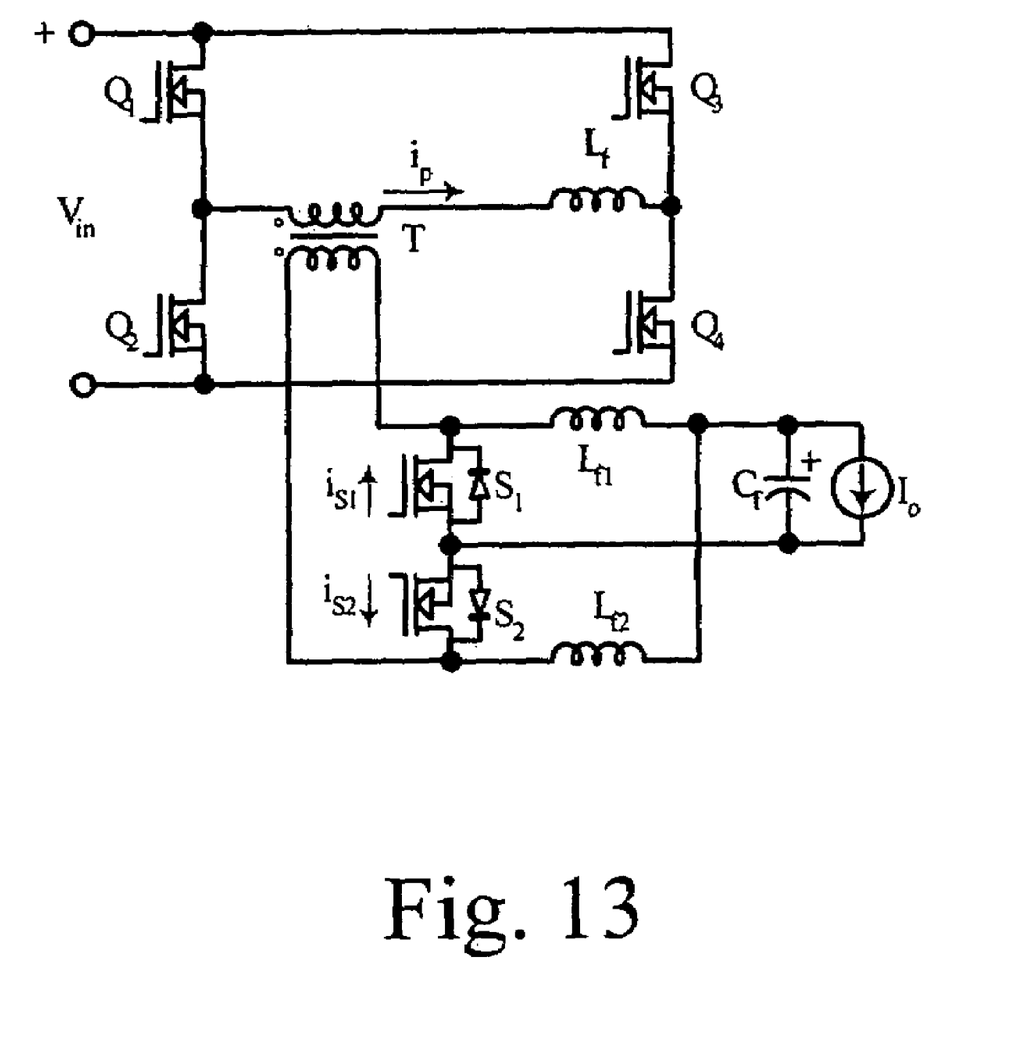
FIG. 13 shows another phase shifted full bridge converter with the current doubler synchronous rectifiers according to the present invention.
Figure 14:
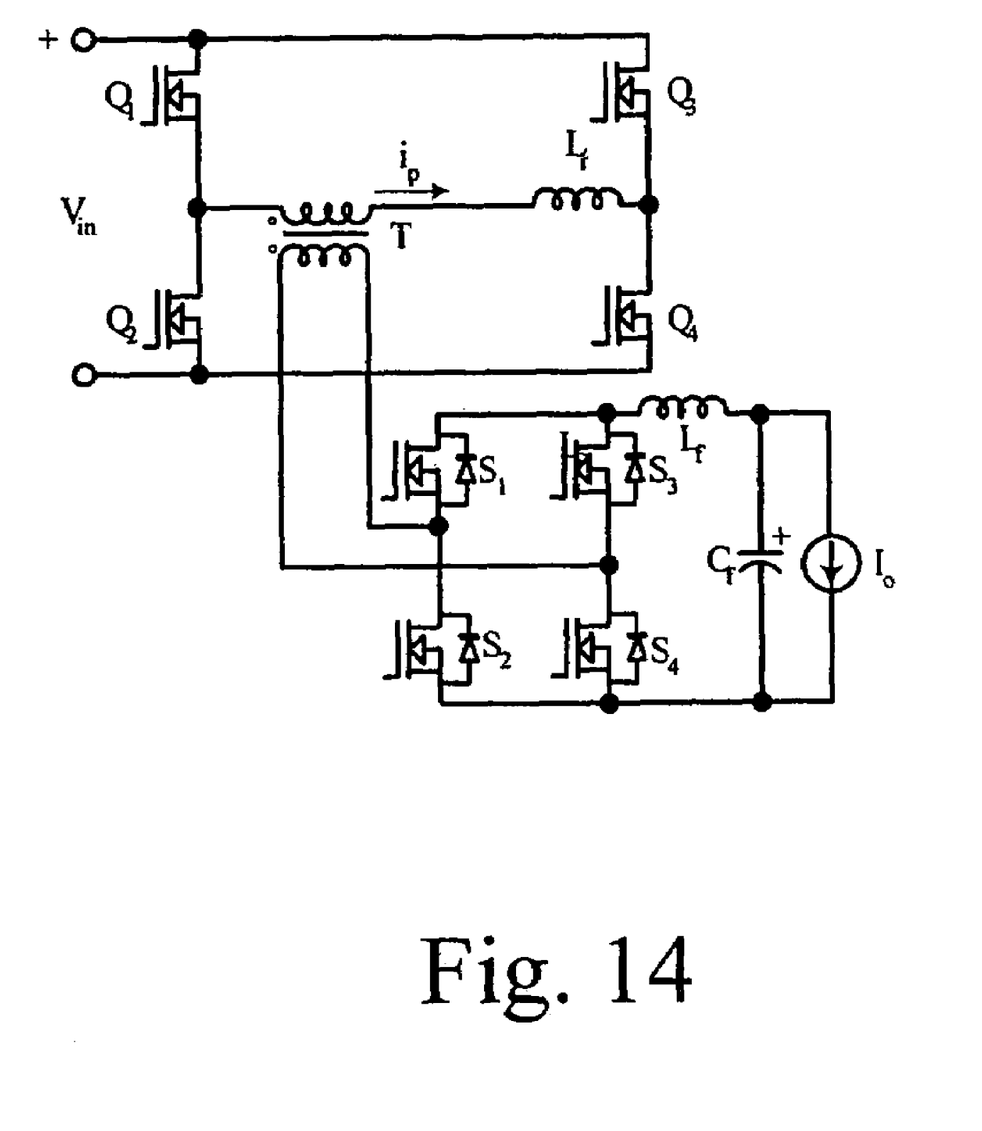
FIG. 14 shows another phase shifted full bridge converter with the full bridge synchronous rectifiers according to the present invention.

FIG. 13 is another phase shifted full bridge converter with the current doubler synchronous rectifiers according to the present invention. FIG. 14 is another phase shifted full bridge converter with the full bridge synchronous rectifiers according to the present invention. The MOSFET $S_1$ and $S_4$ share the same driving signals and The MOSFET $S_2$ and $S_3$ share the same driving signals. The control methods presented in FIG. 8 and FIG. 11 can also be utilized in them to shorten the conduction time of the body diode, to reduce the additional conduction loss, and to improve the converter efficiency.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A control method for a first synchronous rectifier and a second synchronous rectifier in a switching power converter comprising a transformer, and a first switching device and a second switching device connected in series and in parallel with an input voltage source, wherein said first synchronous rectifier is connected with a low end of a secondary winding of said transformer, said second synchronous rectifier is connected with a high end of said secondary winding of said transformer, said first switching device is connected with a high end of said input voltage source, and said second switching device is connected with a low end of said input voltage source, comprising,
    driving said first switching device to an on state and said second switching device to an off state; and
    driving said second synchronous rectifier to an off state not earlier than a time when said second switching device has been driven to an on state, such that a power is delivered from said primary winding to said secondary winding.

2. The control method of claim 1 wherein said switching power converter is further defined as a substantially zero voltage switching asymmetric controlled half bridge converter.

3. The control method of claim 2 further comprises the step of using a pair of combinations of a diode, a resistor, a capacitor, and a buffer to drive said two synchronous rectifiers.

4. The control method of claim 1 wherein said switching power converter is further defined as a substantially zero voltage switching phase shifted full bridge converter.

5. The control method of claim 4 further comprises the step of using 4 logic NAND gates to drive said two synchronous rectifiers.

6. The control method of claim 1 further comprises the step of using a series resonance of a resonant inductor to drive said second switching device to said on state.

7. A switching power converter, comprising:
    an input voltage source having a high end and a low end;
    a first switching device connected with said high end of said input voltage source, and a second switching device connected with said low end of said input voltage source, wherein said two switching devices are connected in series and in parallel with said input voltage source;
    a transformer having a primary winding and a secondary winding, wherein a high end of said primary winding is connected with said input voltage source, and a low end of said primary winding is connected with said two switching devices;
    a rectifying circuit comprising a first synchronous rectifier connected with a low end of said secondary winding and a second synchronous rectifier connected with a high end of said secondary winding; and
    a control circuit connected with said first switching device, said second switching device, and said rectifying circuit and operable to drive said second synchronous rectifier to an off state not earlier than a time when said second switching device has been driven to an on state, and to drive said first synchronous rectifier to an off state not earlier than a time when said first switching device has been driven to an on state.

8. The switching power converter of claim 7 is further defined as a substantially zero voltage switching asymmetric controlled half bridge converter.

9. The switching power converter of claim 8 further comprises two capacitors connected in series between said high end and said low end of said input voltage source and connected with said high end of said primary winding.

10. The switching power converter of claim 9 wherein said control circuit comprises a pair of combinations of a diode, a resistor, a capacitor, and a buffer.

11. The switching power converter of claim 7 is further defined as a substantially zero voltage switching phase shifted full bridge converter.

12. The switching power converter of claim 11 further comprises two switching devices connected in series between said high end and said low end of said input voltage source and connected with said high end of said primary winding.

13. The switching power converter of claim 12 wherein said control circuit comprises 4 logic NAND gates.

14. The switching power converter of claim 7 wherein said two switching devices are further defined as MOSFET switches.

15. The switching power converter of claim 7 wherein said two synchronous rectifiers are further defined as MOSFET switches.

16. The switching power converter of claim 7 further comprises a resonant inductor connected between said low end of said primary winding and a connecting node of said first and second switching devices.

17. The switching power converter of claim 16 wherein said resonant inductor comprises a leakage inductance of said transformer and an external series inductance.

18. The switching power converter of claim 7 wherein said switching power converter further comprises a third synchronous rectifier and a fourth synchronous rectifier, said third synchronous rectifier is connected with said first synchronous rectifier in series at said low end of said secondary winding of said transformer, said fourth synchronous rectifier is connected with said second synchronous rectifier in series at said high end of said secondary winding of said transformer, said first synchronous rectifier shares the same drive signal with said second synchronous rectifier, said third synchronous rectifier shares the same drive signal with said fourth synchronous rectifier, said first and said second synchronous rectifiers both have been driven to an off state not earlier than a time when said first switching device has been driven to an on state, and said third and fourth synchronous rectifiers both have been driven to an off state not earlier than a time when said second switching device has been driven to an on state.

19. The control method of claim 1 wherein said switching power converter further comprises a third synchronous rectifier and a fourth synchronous rectifier, said third synchronous rectifier is connected with said first synchronous rectifier in series at said low end of said secondary winding of said transformer, said fourth synchronous rectifier is connected with said second synchronous rectifier in series at said high end of said secondary winding of said transformer, said first synchronous rectifier shares the same drive signal with said second synchronous rectifier, said third synchronous rectifier shares the same drive signal with said fourth synchronous rectifier, said first and said second synchronous rectifiers both have been driven to an off state not earlier than a time when said first switching device has been driven to an on state, and said third and fourth synchronous rectifiers both have been driven to an off state not earlier than a time when said second switching device has been driven to an on state.

20. A control method for a first synchronous rectifier and a second synchronous rectifier in a switching power converter comprising a transformer, a first switching device and a second switching device connected in series and in parallel with an input voltage source, and a third switching device and a fourth switching device also connected in series and in parallel with said input voltage source, wherein said first synchronous rectifier is connected with a low end of a secondary winding of said transformer, said second synchronous rectifier is connected with a high end of said secondary winding of said transformer, said first switching device and said third switching device are connected with a high end of said input voltage source, and said second switching device and said fourth switching device are connected with a low end of said input voltage source, comprising,
- turning on and off said first switching device and said second switching device alternatively;
- turning on and off said third switching device and said fourth switching device alternatively;
- driving said first synchronous rectifier to an off state not earlier than a time when said third switching device has been driven to an on state; and
- driving said second synchronous rectifier to an off state not earlier than a time when said fourth switching device has been driven to an on state.

* * * * *